Oct. 20, 1936.  E. BREITLING  2,057,657
ACCOUNTING MACHINE
Filed June 13, 1935  7 Sheets-Sheet 1

Inventor
Ernst Breitling
By Carl Beust
His Attorney

Oct. 20, 1936.  E. BREITLING  2,057,657
ACCOUNTING MACHINE
Filed June 13, 1935  7 Sheets-Sheet 2

Inventor
Ernst Breitling
By Earl Benst
His Attorney

Oct. 20, 1936.  E. BREITLING  2,057,657
ACCOUNTING MACHINE
Filed June 13, 1935  7 Sheets-Sheet 3

Inventor
Ernst Breitling
By Carl Benst
His Attorney

Oct. 20, 1936.  E. BREITLING  2,057,657
ACCOUNTING MACHINE
Filed June 13, 1935    7 Sheets-Sheet 4

Inventor
Ernst Breitling
By Carl Beust
His Attorney

Oct. 20, 1936.    E. BREITLING    2,057,657
ACCOUNTING MACHINE
Filed June 13, 1935    7 Sheets-Sheet 5

Inventor
Ernst Breitling
By Earl Benst
His Attorney

Oct. 20, 1936.　　　　E. BREITLING　　　　2,057,657
ACCOUNTING MACHINE
Filed June 13, 1935　　　　7 Sheets-Sheet 6
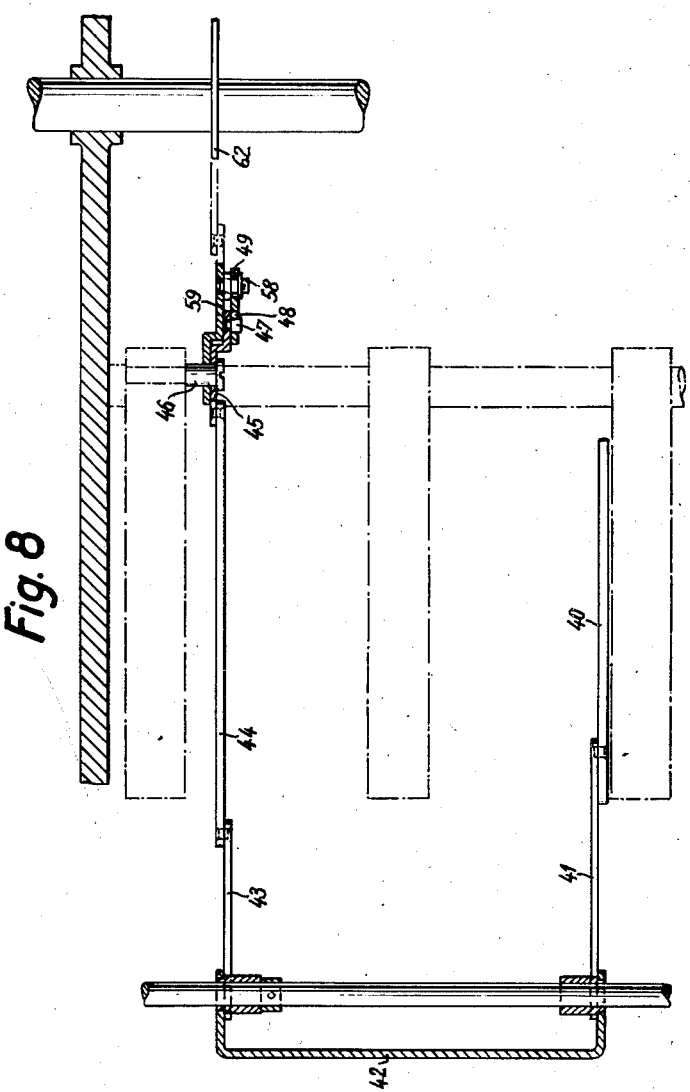

Oct. 20, 1936.   E. BREITLING   2,057,657
ACCOUNTING MACHINE
Filed June 13, 1935   7 Sheets-Sheet 7

Patented Oct. 20, 1936

2,057,657

UNITED STATES PATENT OFFICE 2,057,657

ACCOUNTING MACHINE

Ernst Breitling, Berlin-Tempelhof, Germany, assignor to The National Cash Register Company, Dayton, Ohio, a corporation of Maryland Application June 13, 1935, Serial No. 26,369
In Germany March 22, 1933

4 Claims. (Cl. 235—7)

The invention relates to accounting machines and more particularly to a machine having a separate totalizer for accumulating deposits and withdrawals, and means to select the totalizers.

The object of the invention is to provide a novel means to select and engage totalizers with actuators in order to classify entries made in the machine.

A specific object of the invention is to provide a totalizer engaging control means which is controlled to engage a selected totalizer under control of keys on the keyboard, together with automatic means to throw off the engaging means, even though the control keys are depressed.

With this and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of said drawings:

Fig. 8 is a section through the totalizer disabling mechanism taken along the line VIII—VIII in Fig. 7.

General description

Figure 1:
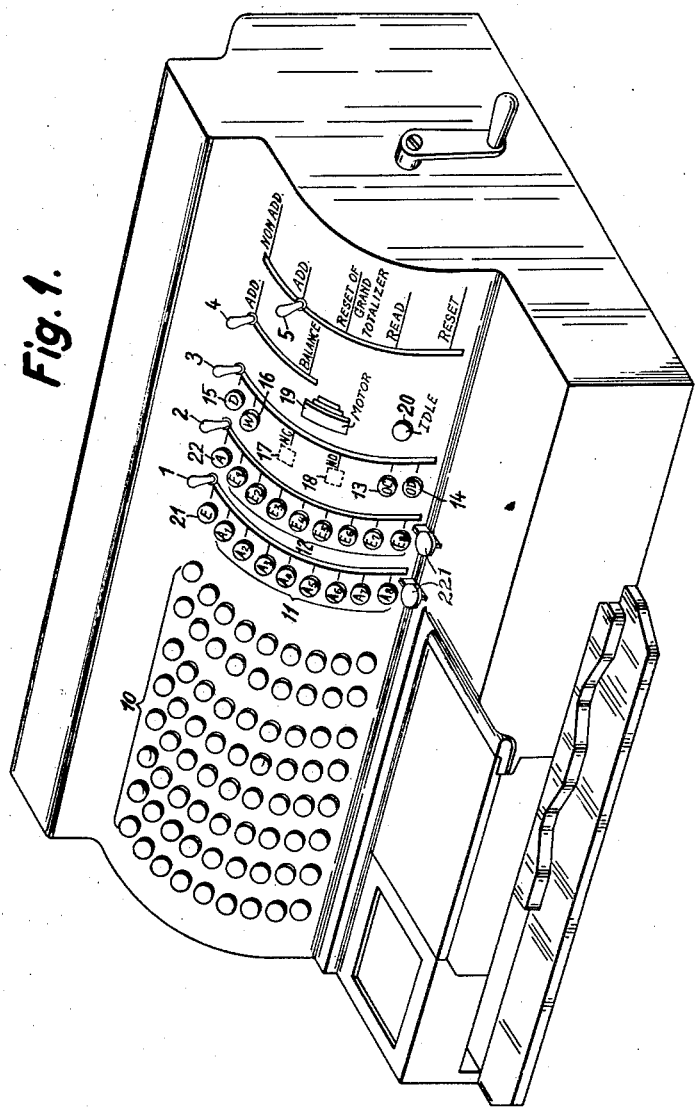
Fig. 1 shows the keyboard of the machine.

The machine described is a balance accumulating machine of the known type, and the keyboard (Fig. 1) has the usual amount keys 10, two rows of auxiliary totalizer keys 11 and 12, the balance keys 13 and 14 for the old credit and old debit balances, the balance keys 15 and 16 for the deposits and withdrawals, the blind keys 17 and 18 for the new credit and new debit balances, the motor key 19, the idle key 20, the totalizer levers 1, 2, and 3, the mode of operation lever 4 for the balance mechanism, and the mode of operation lever 5 for the remaining totalizers. Besides these known devices there is provided in each of the rows 11 and 12 of auxiliary totalizers a special control key 21, 22, each of which keys is allotted to a special totalizer, and besides there is provided a special position "reset of grand totalizer" for the mode of operation lever 5.

During normal entries of simple deposits or withdrawals, the machine is actuated in the known manner, i. e., the old credit or old debit balance is entered, using the amount keys 10, the balance key 13 or 14, and the motor key 19, all the levers remaining in their normal, or "addition", positions. Then the deposit, or withdrawal, is entered, using the amount keys 10, the balance key 15 or 16, the corresponding auxiliary totalizer key 11 or 12, and the motor key 19. To determine the new credit, or new debit, balance thereby obtained, the mode of operation lever 4 is set to "balance", and the blind key 17 or 18, corresponding to the condition of the balance mechanism, is engaged, and the machine is released for operation by depressing the motor key 19.

When, however, the amounts of a deposit or a withdrawal list are to be entered, a control of the entry is required which will insure that all the amounts contained on such a list are correctly entered and that none of these amounts is forgotten or entered twice. To this end, in the row of withdrawal totalizers there is provided a group totalizer for accumulating the deposit amounts, and in the row of deposit totalizers there is provided a group totalizer for accumulating the withdrawal amounts. The amounts set out on the deposit or withdrawal list are accumulated during their entry in the corresponding group totalizer and the sum formed thereby is printed on the list when the group totalizer is reset to zero.

After the list of deposits and withdrawals has been entered, the operator can check his entries by again adding the list of deposits and withdrawals. If the second computations agree with the totals on the group totalizers, the entries are correct. This gives the operator a control over the correct entry of the amounts on the list.

Figure 2:
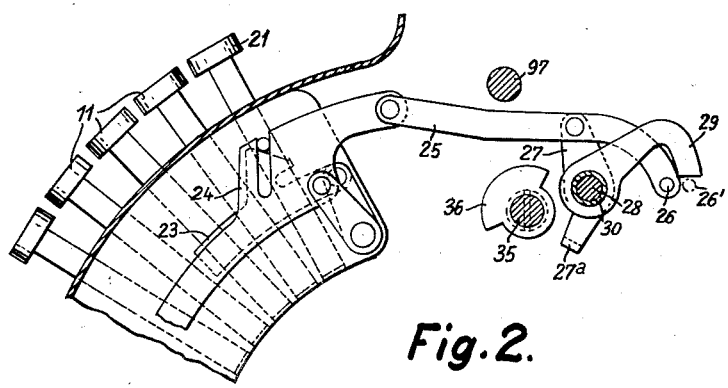
Fig. 2 is a side elevation of the accumulator key interlocks in the plane of the withdrawal key bank.
Figure 3:
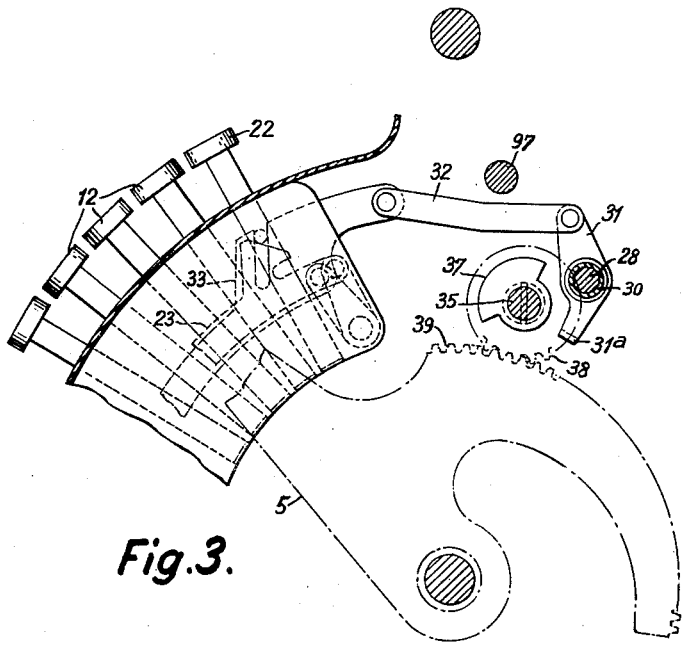
Fig. 3 is a side elevation of the accumulator key interlocks in the plane of the deposit key bank.

To carry out a list entry consisting of a large number of deposits or withdrawals associated with different accounts, the corresponding accumulator key 21 or 22 is first depressed, i. e., the key 21 in the case of a deposit list and the key 22 in the case of a withdrawal list. The accumulator key 21 which selects the totalizer for accumulating the deposit amounts is located in the bank of withdrawal keys 11, and the key 22 which selects the totalizer for accumulating the withdrawals is located in the bank of deposit keys 12. As in each bank of keys only one key can be depressed at a time, when the deposit control key 21 is depressed, it is only possible to depress one of the deposit keys 12, and when the withdrawal control key 22 is depressed, only one of the withdrawal keys 11 can be depressed. The depressed control key 21 or 22 is in known manner held in the depressed position each by a special locking detent 23 (Figs. 2 and 3) until it is released by hand. The corresponding control key, therefore, need be depressed only once during the entry of all the amounts contained on a list.

When it is desired to release a depressed key 21 or 22, any well known release key 221 (Fig. 1) like that shown in application Serial No. 464,614, filed June 28, 1930, on which United States Letters Patent No. 2,056,821, issued on October 6, 1936, is depressed.

Interlock between control keys

Figure 5:
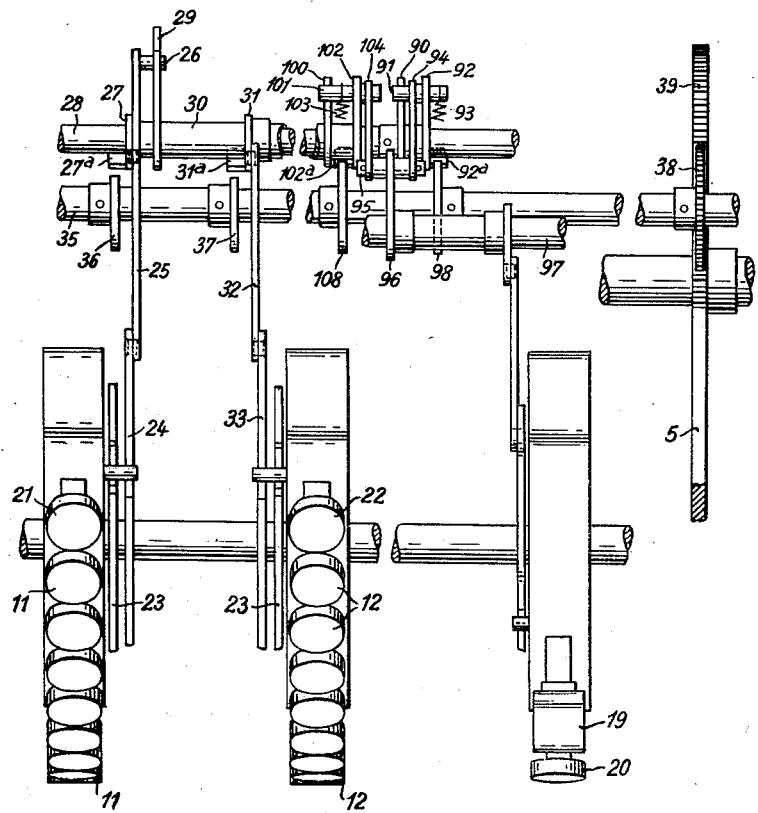
Fig. 5 is a plan view of the accumulator key interlocking mechanism shown in Figs. 2, 3, and 4.

The key stem of the control key 21 cooperates with a slide 24 (Figs. 2 and 5) to which is pivoted a link 25 which is carried by an arm 27 fastened to a shaft 28. To the link 25 is fixed a pin 26 which lies in the plane of a hook arm 29. The hook arm 29 is fastened at one end to a sleeve 30 journaled on the shaft 28. The sleeve 30 also carries an arm 31 (Figs. 3 and 5) which is connected by means of a link 32 with the slide 33 which cooperates with the key stem of the control key 22. On depression of the control key 21 the slide 24 is moved upwardly and the link 25 is moved to the right, whereby the pin 26 takes up the chain-dotted position 26'. In this position the pin 26 prevents clockwise movement of the hook arm 29, which takes place when the control key 22 is depressed. Consequently in this case the control key 22 cannot be depressed. If, on the other hand, the control key 22 is first depressed, it rotates the hook arm 29 in a clockwise direction through the intermediary of the link 32, the lever 31, and the sleeve 30, with the result that the hook arm prevents the pin 26 from moving to the right and consequently the control key 21 from being depressed. There is thus provided an interlock between the two control keys 21, 22, which insures that at any time only one of the control keys can be depressed.

Interlock between control keys and mode of operation lever

The two arms 27 and 31 (Figs. 2, 3, and 5) are provided at their lower ends with lugs 27a and 31a respectively, each of which cooperates with one of a pair of cams 36, 37 fixed on a shaft 35. The shaft 35 has fastened thereon a pinion 38, meshing with teeth 39 on the mode of operation lever 5, so that the cams 36 and 37 are correspondingly rotated when the mode of operation lever 5 is operated. When the mode of operation lever 5 stands on "non-add", "add", or "reset of grand totalizer", the cams 36, 37 have their cutaway portions opposite the lugs 27a and 31a so that they do not prevent the swinging movements of the arms 27 and 31, with the result that the control keys 21 and 22 can be depressed. If, on the other hand, the mode of operation lever 5 is set to "read" or "reset", the shaft 35 and cams 36 and 37 are turned to an extent such that the raised portions of the cams lie opposite the lugs 27a and 31a, with the result that in these two positions of the mode of operation lever the control keys 21 and 22 are locked. Similarly, when a control key 21 or 22 is depressed, the mode of operation lever 5 cannot be set to "read" or "reset", as the lug 27a or 31a, which is swung clockwise when the control key 21 or 22 is depressed, prevents further movement of the cam 36 or 37 and thus stops the mode of operation lever 5 from moving beyond the position "reset of grand totalizer".

Totalizer engaging mechanism

Figure 6:
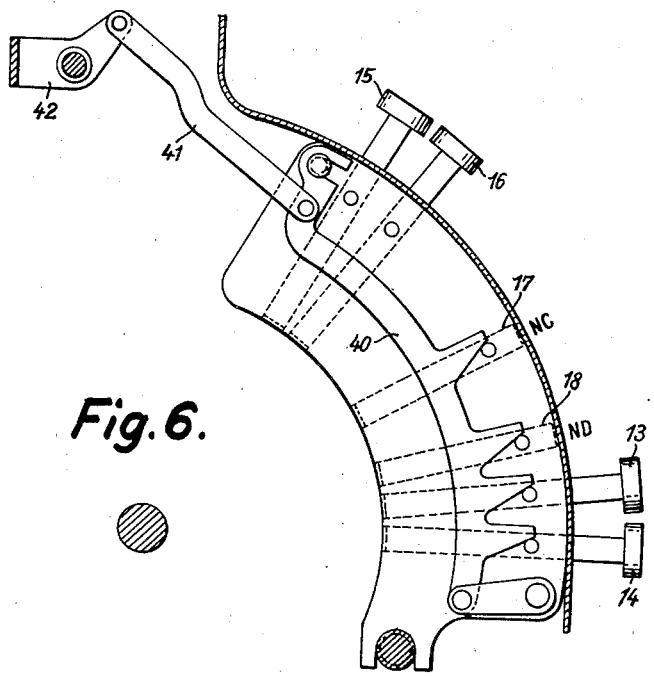
Fig. 6 is a side elevation of the balance key bank.
Figure 7:
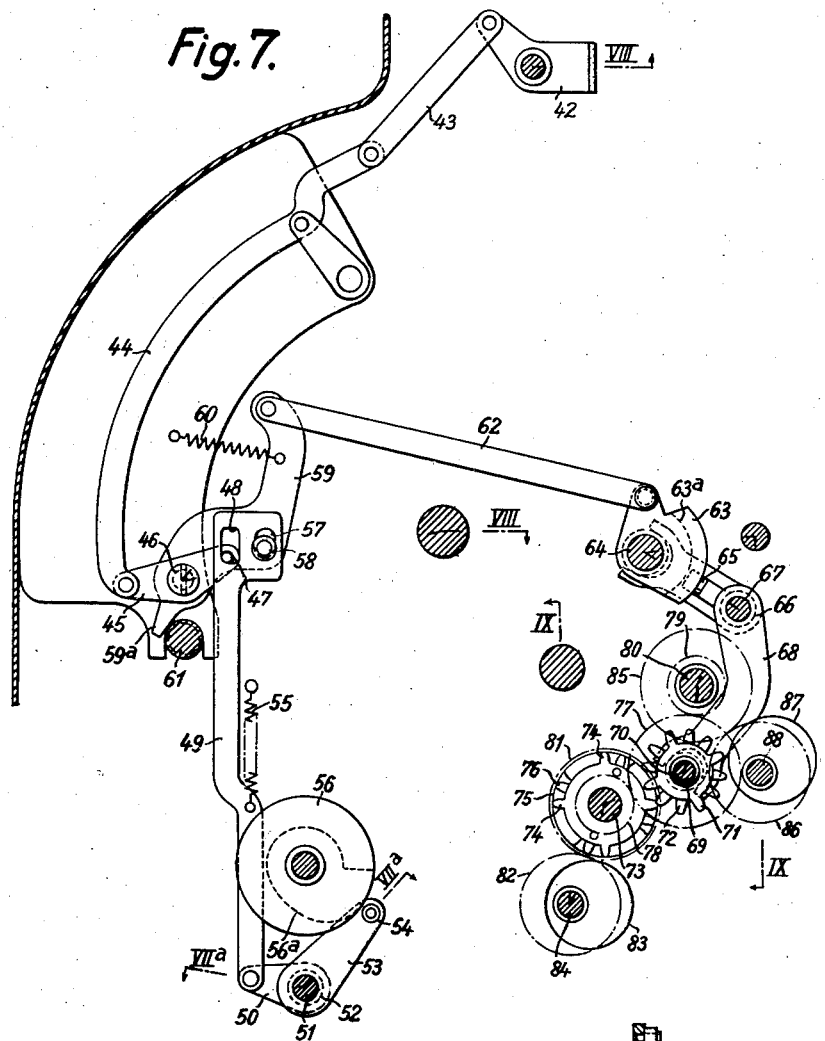
Fig. 7 is a side elevation of the mechanism for disabling the rows of auxiliary totalizers.
Figure 7A:
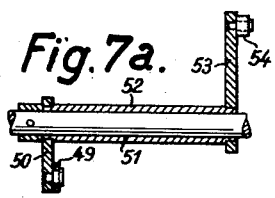
Fig. 7a is a section taken along the line VIIa—VIIa in Fig. 7.
Figure 9:
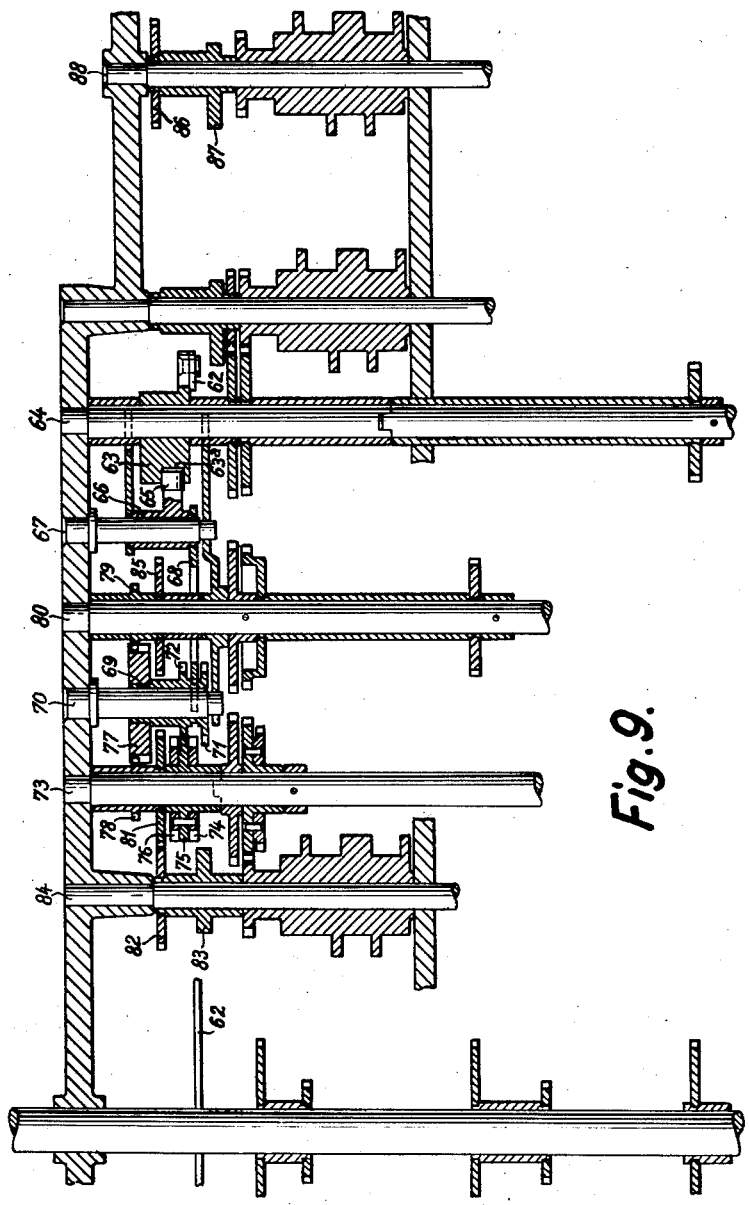
Fig. 9 is a section through the disabling mechanism taken along the line IX—IX in Fig. 7.

The two totalizers selected by keys 21 and 22 should only operate to take up the amounts of the deposits or withdrawals respectively, but as the control key 21 or 22 which is being used remains depressed during the entry of the old amount and during the taking of the new balance, the two rows of auxiliary totalizers are disengaged during the two letter operations by the arrangement about to be described, in spite of the fact that one of the control keys in these two rows is depressed. The balance key bank (Figs. 6, 7, and 9) is provided with a movable slide 40 which is moved upwards on the depression of one of the keys 13, 14, 17, or 18. The slide 40 is connected by means of a link 41, a yoke 42, and a link 43 with a slide 44 provided in the withdrawal key bank (Figs. 7 and 9) which is pivoted at its lower end to an arm 45 which in turn is mounted on a stud 46. The rearward prolongation of the arm 45 carries a pin 47 which engages a slot 48 in a pitman 49. The pitman 49 is pivoted at its lower end to an arm 50 fastened to a sleeve 52 journaled on the axle 51 (Figs. 7 and 7a). To the sleeve 52 is fastened an arm 53 which carries a roller 54. A spring 55 connected to the pitman 49 draws the latter upwardly and holds the lower end of the slot 48 in engagement with the pin 47 on the lever 45, whereby the roller 54 is held out of engagement with a cam 56. A second slot 57, in the pitman 49, engages a pin 58 connected to a lever 59 which is rotatable about the stud 46, and which is normally held by a spring 60 with its lower end 59a abutting against a fixed shaft 61. The lever 59 is connected by a link 62 to a grooved cam segment 63 which is rotatable about a shaft 64 and is formed with a cam groove 63a (Figs. 7 and 9). The cam groove 63a engages a roller 65 which is mounted on a sleeve 66 slidable on a stub shaft 67. An arm 68 rigidly connected to the sleeve 66 engages with its forked end in an annular groove in a gear wheel hub 69, slidably and rotatably mounted on a stub shaft 70. To the hub 69 are rigidly connected two mutilated gear wheels 71 and 72 which can cooperate with a cam pack 74, 75, 76 mounted on the shaft 73 in such a way as to be held against sliding movement on the shaft. This cam pack is driven from the machine drive at predetermined times which are varied in correspondence with the different modes of operation. In the position shown in Fig. 9 the gear wheel 72, which is provided with four locking gaps by leaving out every third tooth, lies opposite the full cam disc 75, while the wheel 71 and also the driving wheel 76, constituting the rear member of the cam pack, lie clear. Normally the sleeves 69 and the wheels 71, 72 are held, in the manner described below, in such a position that the wheel 71 lies opposite the wheel 74, forming the front member of the cam pack and the escapement wheel 72 opposite the driving wheel 76. In both cases, however, the wheel 72 and sleeve 69 are held against rotation in the rest position of the machine by reason of the fact that either the full cam disc 75 or a locking surface on the driving wheel 76 engages in one of the gaps in the wheel 72. The sleeve 69 also carries a wide pinion 77 which is in engagement in either end position of the sleeve with two pinions 78 and 79, which are journaled respectively on the shafts 73 and 80. The pinion 78 is rigidly connected to a gear wheel 81 which engages a gear wheel 82 on the shaft 84. To the latter is rigidly coupled an eccentric 83. Similarly the pinion 79 is permanently connected by means of the gear wheels 85, 86 with an eccentric 87. When the sleeve 69 occupies its normal position, in which the wheels 71, 74 and 72, 76 lie opposite one another in pairs, the first driving movement of the cam pack 74, 75, 76 rotates the wheels 71, 72, 77 through 90 degrees, which movement is communicated to the eccentrics 83 and 87 as a rotation through 180 degrees by the gear chains 78, 81, 82 and 79, 85, 86 respectively. This rotation of the two eccentrics is utilized to rock the two rows of auxiliary totalizers into engagement with the differential actuators. The mechanism operated by the eccentrics is shown in Fig. 10 of the French Patent No. 665,190, issued to Fried. Krupp. The second partial revolution of the cam pack 74—76 is similarly transmitted to the two eccentrics 83 and 87 and rocks the two rows of auxiliary totalizers out of engagement. The timing of these two driving movements of the cam packs 74—76, i. e., for the rocking in and rocking out of the two rows of auxiliary totalizers is determined in known manner (not shown herein) by the setting of the mode of operation lever.

*Totalizer throwoff mechanism*

It follows from the previous description that when the wheel 72 lies opposite the full locking disc 75 owing to displacement of the sleeve 69 into the position shown in Fig. 9, the driving movement of the cam pack 74, 76 is inoperative and the eccentrics 83 and 87 are not turned so that the rows of auxiliary totalizers are not rocked into engagement. Displacement of the sleeve 69 into the disengaging position shown in Fig. 9 is effected in the following manner by operations already described (Figs. 6 to 9). When one of the balance keys 13, 14, 17, or 18 is depressed, the slide 40 is moved upwardly and the slide 44 shares this movement owing to the connecting bridge 41, 42, 43. The pin 47 of the lever 45, therefore, depresses the pitman 49 to an extent such that the parts 50, 52, 53 move the roller 54 into the groove 56a of the cam 56. On depressing one of the balance keys, this initial setting movement only is effected, and the actual displacement of the sleeve 69 is effected by means of the machine drive itself, since by rotation of the disc 56 in the counter-clockwise direction the lever 53 is rocked further in the counter-clockwise direction by the cam slot 56. This rocking of the lever 53 is converted by the parts 52, 50, 49, 58, 59, 62 into a rotation of the cam groove segment 63 in the clockwise direction. In consequence of the shape of the groove 63a, the hub 66, arm 68, and consequently the sleeve 69 are so displaced that the wheel 72 comes opposite the locking disc 75, whereby the wheel 72 remains locked during the rotation of the cam pack 74—76. It follows that in all machine operations in which one of the old or new balance keys 13, 14, 17, or 18 is depressed, the two auxiliary totalizer rows remain disengaged even when an accumulator key has been depressed in one of the key banks corresponding to these totalizers.

While, in order to reset the auxiliary totalizers, the mode of operation lever 5 must be adjusted to "reset" and the corresponding totalizer lever 1, 2, or 3 set to the totalizer to be reset, in order to reset the accumulators it is only necessary to set the mode of operation lever 5 to "reset of grand totalizer", the selection of the totalizer being effected automatically by the control key 21 or 22 which remains depressed. The totalizer levers 1, 2, and 3 are hereby locked in such a way that they are not—as is usually the case— set free by adjustment of the mode of operation lever to a total taking position, but they remain locked when the mode of operation lever 5 is set to "reset of grand totalizer" in the same way as in the "add" position of the mode of operation lever.

*Motor bar release mechanism*

Figure 4:
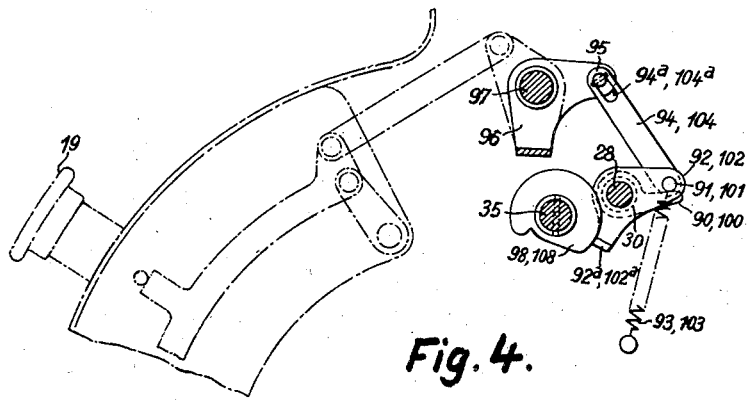
Fig. 4 is a side elevation of the mechanism for freeing the motor key.

The shaft 28, which is rotated by depressing the control key 21, has fixed to it an arm 90 (Figs. 4 and 5) against which abuts a pin 91 carried by a bell-crank lever 92 which is freely rotatable under the influence of the spring 93 about the shaft 28. To the pin 91 is journaled a link 94, which is provided at its far end with a slot 94a in which engages a pin 95 carried by a yoke 96 journaled on a shaft 97. In the same way the sleeve 30, which is rotated on depressing the control key 22, has fixed to it an arm 100 against which abuts a pin 101 carried on a bell-crank lever 102 which is freely rotatable on the shaft 28 under the action of a spring 103. To the pin 101 is journaled a link 104 which is provided at its far end with a slot 104a in which the pin 95 on the yoke 96 likewise engages. The rocking of the yoke 96 in a clockwise direction is utilized in know manner to free the motor key 19 by means of the mechanism indicated in chain-dotted lines in Fig. 4.

The two bell-crank levers 92 and 102 are bent outwardly at their lower ends 92a and 102a to form abutments each of which engages one of a pair of cams 98 and 108 which are fixed to the shaft 35 and are consequently rotated when the mode of operation lever 5 is moved. If, for example, the control key 21 is depressed and the arm 90 is consequently rocked in clockwise direction, the spring 93 cannot draw the pin 91 downwardly, unless the mode of operation lever 5 stands on "reset of grand totalizer", as in all its other positions the outwardly bent part 92a of the bell-crank lever 92 lies opposite the raised portion of the cam 98. The freeing of the motor key by rocking of the yoke 96 must in this case be effected by other means which are not illustrated, since they form no part of the present invention. If, on the other hand, the mode of operation lever 5 is adjusted to "reset of grand totalizer", the shaft 35 is rotated so that the cut-away portions of the cams 98 and 108 come opposite the bent up portions 92a and 102a of the bell-crank levers 92, 102, with the result that that lever whose pin 91 or 101 lies opposite the arm (e. g. arm 90) rocked by the control key which is depressed can swing downwardly under the action of the spring 93 in clockwise direction. The associated link—in this case link 94—then rocks the lever 96, whereby the pin 95 can move unhindered in the slot 104a of the other link 104 which is held fixed. The rocking of the yoke 96 and consequent freeing of the motor key 19 is therefore effected on total taking from the totalizer whose key is depressed simply by adjustment of the mode of operation lever to the position "reset of grand totalizer". If, during a list entry, one or more simple entering operations are to be effected immediately, the list entries can be interrupted simply by releasing the control key 21 or 22 and after completion of the entry of the separate items the list entries can be resumed by re-depressing the control key.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described, the combination of totalizer engaging mechanism with intermittent driving connections to normally actuate the engaging mechanism, a normally inactive cam to disable the driving connections whereby the engaging mechanism is rendered inactive, operating means for the cam, means to actuate the operating means, said last named means normally disconnected from the operating means, and a manipulative means to connect the operating means with said last named means, whereby the cam is operated to disable the driving connections for the engaging means.

2. In a machine of the class described, the combination of totalizer engaging mechanism with intermittent gear driving connections for said engaging mechanism, including a gear shiftable from a normal engaged position in which the engaging mechanism is operated into a disengaged position, a normally active cam to shift the shiftable gear into the disengaged position, connections to actuate the cam including a rockable arm, a cam associated with the rockable arm to operate the connections, said cam and arm being normally disconnected, and manipulative means to connect the arm and last named cam whereby the first named cam is operated to disable the engaging mechanism.

3. In a machine of the class described, the combination of a totalizer engaging mechanism, with driving mechanism for the engaging mechanism, a cam for determining the effectiveness of the driving mechanism, a second cam, connections between the two cams normally uncoupled from the second cam, a manipulative device, and means operated by the manipulative device to actuate certain elements of the connections to couple the connections with the second cam, whereby the second cam operates the connections and the first cam to render the engaging mechanism ineffective.

4. In a machine of the class described, the combination of a totalizer engaging mechanism, with driving mechanism for the engaging mechanism, a cam for determining the effectiveness of the driving mechanism, a second cam, connections between the two cams normally uncoupled from the second cam, said connections having a yielding joint, a manipulative device, means operable by the manipulative device to actuate the elements of the connections between the yielding joint and the second cam whereby the connections are coupled to the second cam, said second cam thereafter adapted to actuate the connections to operate the first cam to render the engaging mechanism ineffective.

ERNST BREITLING.